United States Patent
Siemons et al.

(10) Patent No.: US 8,855,252 B2
(45) Date of Patent: Oct. 7, 2014

(54) METHOD AND APPARATUS FOR REDUCING OR REMOVING CLICK NOISE

(75) Inventors: Jasper Siemons, Nuenen (NL); Gertjan Groot Hulze, Eindhoven (NL)

(73) Assignee: NXP, B.V., Eindhoven (NL)

( * ) Notice: Subject to any disclaimer, the term of this patent is extended or adjusted under 35 U.S.C. 154(b) by 216 days.

(21) Appl. No.: 13/359,816

(22) Filed: Jan. 27, 2012

(65) Prior Publication Data

US 2012/0207255 A1 Aug. 16, 2012

(30) Foreign Application Priority Data

Feb. 10, 2011 (EP) .................................... 11154038

(51) Int. Cl.
*H04B 1/10* (2006.01)

(52) U.S. Cl.
CPC ................... *H04B 1/1081* (2013.01)
USPC ........................................ 375/346; 375/350

(58) Field of Classification Search
CPC ...... H04B 1/1027; H04B 1/10; H04B 1/1081; H04B 1/109; H04B 1/1676; H04B 1/1036; H04L 27/2647
USPC .................. 375/284–285, 346, 350
See application file for complete search history.

(56) References Cited

U.S. PATENT DOCUMENTS

| | | | | |
|---|---|---|---|---|
| 4,879,729 A | * | 11/1989 | Salembier et al. | 375/350 |
| 4,994,754 A | * | 2/1991 | Ohta | 329/318 |
| 5,710,555 A | * | 1/1998 | McConnell et al. | 340/916 |
| 5,768,291 A | | 6/1998 | Kelton et al. | |
| 6,052,420 A | * | 4/2000 | Yeap et al. | 375/346 |
| 6,055,310 A | * | 4/2000 | Zhang et al. | 379/406.08 |
| 6,229,573 B1 | * | 5/2001 | Sato et al. | 348/516 |
| 6,326,712 B1 | * | 12/2001 | Nakazawa et al. | 310/90.5 |
| 6,496,547 B1 | | 12/2002 | Powell et al. | |
| 6,690,805 B1 | * | 2/2004 | Tsuji et al. | 381/94.1 |
| 6,714,588 B1 | * | 3/2004 | Thomas et al. | 375/222 |
| 6,940,973 B1 | * | 9/2005 | Yeap et al. | 379/416 |
| 7,983,643 B2 | * | 7/2011 | McCune et al. | 455/254 |
| 2001/0050987 A1 | * | 12/2001 | Yeap et al. | 379/399.01 |
| 2002/0055346 A1 | * | 5/2002 | Tsujishita et al. | 455/296 |
| 2002/0093908 A1 | * | 7/2002 | Yeap | 370/201 |
| 2003/0053098 A1 | * | 3/2003 | Hagai et al. | 358/1.9 |
| 2003/0153270 A1 | * | 8/2003 | Kawakami | 455/63 |
| 2004/0196928 A1 | * | 10/2004 | Hessel | 375/340 |
| 2005/0136956 A1 | * | 6/2005 | Ohno | 455/501 |
| 2005/0212972 A1 | * | 9/2005 | Suzuki | 348/607 |
| 2006/0280314 A1 | * | 12/2006 | Okada et al. | 381/71.1 |
| 2007/0242896 A1 | * | 10/2007 | Okumichi et al. | 382/268 |
| 2009/0080578 A1 | * | 3/2009 | Naniwada | 375/346 |
| 2010/0002807 A1 | * | 1/2010 | McCune et al. | 375/319 |
| 2010/0013553 A1 | * | 1/2010 | Ido et al. | 329/316 |
| 2010/0157080 A1 | * | 6/2010 | Kondo | 348/222.1 |
| 2011/0019832 A1 | * | 1/2011 | Itou et al. | 381/66 |

FOREIGN PATENT DOCUMENTS

| | | |
|---|---|---|
| JP | 09-083384 A | 3/1997 |
| JP | 10-013261 A | 1/1998 |
| WO | 98/42081 A1 | 9/1998 |

* cited by examiner

*Primary Examiner* — Emmanuel Bayard

(57) ABSTRACT

The invention relates to an apparatus and a method for detecting and correcting input signals regarding click noise, using a first detector unit and a second correction unit, the detector unit differentiates the input signal and extracts the noise signal and compares the sum of two noise samples with a threshold value and in case this sum exceeds the threshold value a click is observed, while the correction unit corrects the input signal in the phase domain and differentiates it prior to outputting the corrected signal.

9 Claims, 2 Drawing Sheets

METHOD AND APPARATUS FOR REDUCING OR REMOVING CLICK NOISE

This application claims the priority under 35 U.S.C. §119 of European patent application no. 11154038.1, filed on Feb. 10, 2011, the contents of which are incorporated by reference herein.

FIELD OF THE INVENTION

The invention relates to a method and an apparatus for reducing or removing click noise as claimed in claim 1 and in claim 8.

BACKGROUND OF THE INVENTION

The click noise is a commonly known effect which occurs in applications of e.g. FM radio receivers which may be caused by multi-path effects. These click noises are not accepted by users of such FM radio receivers and therefore it is of interest to reduce or delete such click noise.

WO 98/42081 discloses an adaptive multi-path filter which eliminates audibly objectionable click noise generated at the output of an FM discriminator to prevent audible distortion or other corruption of the desired signal which may include voice and low speed digital data. Clicks are detected at the discriminator output using a colored-noise, matched filter designed and adapted to the click signature/shape as well as to the desired signal characteristics. The colored-noise matched, filter output is then compared to an adaptive threshold. When the threshold is exceeded, a click is registered as detected. Click duration is then estimated. An estimate of the desired signal is generated and that replaces the originally received data signal estimate within the click duration region. Using characteristics of the desired signal just before and after the detected click noise, the adaptive filter accurately estimates the parameters of the desired signal so that the replacement signal fairly models what the desired signal would have looked like had the click not occurred. In this way, a substantial portion of the desired signal is preserved.

JP 09-083384 discloses a reception intensity detection part which compares each reception intensity with a prescribed value, furthermore it contains a voice level detection part and the voice level is compared with a prescribed value. Each voice level is compared with a prescribed value by the decision part and when the level is higher than the prescribed value, the output is performed. An AND gate performs an output when the simultaneous outputs from the both of the decision parts exist. In a mute control part, an incorporated timer is started by the output from the AND gate. For a fixed time after the output of the AND gate is released, a mute signal is outputted to a digital attenuator for preliminarily set time. The voice output for the period is stopped or is attenuated up to a prescribed level.

JP 10-013261 discloses that a bit error rate measurement takes place and in case the bit error rate exceeds a certain limit, a bit error rate discrimination circuit outputs a mute request signal. A tail end of the mute request signal is extended by using a delay circuit and an OR circuit, to generate an extended mute request signal. A digital voice signal is delayed by a time required for a bit error rate measurement period and a bit error rate discrimination at a delay circuit and outputted via a latch circuit, and while the extended mute request signal is set, the input data are stored by a latch circuit.

OBJECT AND SUMMARY OF THE INVENTION

It is an object of the invention to create a method and an apparatus which allows a better reduction or removal of click noise.

The object of the invention will be solved by a method according to the features of claim 1. The inventive method for detecting and correcting input signals regarding click noise, uses a first detector unit or circuit and a second correction unit or circuit, the detector unit differentiates the input signal and extracts the noise signal and compares the sum of two noise samples with a threshold value and in case this sum exceeds the threshold a click is observed, while the correction unit corrects the input signal in the phase domain and differentiates it to the frequency domain prior to outputting the corrected signal.

One of the advantages of the inventive method is that the reduction or removal takes place in the phase domain, i.e. in the received carrier signal instead an audio signal after demodulation. This leads to a better estimation of the correction which allows an at least almost perfect repair of click noise.

Furthermore it is possible to limit the reduction of clicks to audible clicks with preferably low frequency content while inaudible clicks or disturbances are left untouched.

According to an inventive embodiment it is of advantage that the detector unit performs at first a differentiation of the input signal $\Phi_i[n]$ and that the differentiation creates a signal $\omega_i[n]$ which is preferably a MPX signal.

Furthermore it is of advantage that the extraction of the noise of the signal $\omega_i[n]$ takes place while the extraction will be realised such that a low pass filtered version of the $\omega_i[n]$ signal will be subtracted from a delayed $\omega_i[n]$ signal.

Additionally it is of advantage that subsequently two consecutive noise samples will be added, creating a further signal $S_2[n]$ which will be used as a basis for the comparison with a predetermined threshold value T2 such that in case the absolute value of the signal $S_2[n]$ exceeds the threshold value T2 a click will be detected. The click detection can be realised within the time domain by a respective analysis in the time domain.

The inventive click detector can additionally be used as reception quality detector besides the click detection.

According to an inventive embodiment it is of advantage that upon detection of a click a predetermined amount phase samples will be corrected.

Preferably the three phase samples causing the click will be corrected.

According to an inventive aspect, the method has been implemented within a digital signal processor.

According to another inventive aspect the object of the invention will be solved by the features of claim 8. The inventive apparatus for reducing or removing click noise from input signals comprises a first detector unit and a second correction unit, the detector unit differentiates the input signal and extracts the noise signal and compares the sum of two noise samples with a threshold value and in case this sum exceeds the threshold a click is observable, while the correction unit corrects the input signal and differentiates it prior to outputting the corrected signal.

BRIEF DESCRIPTION OF THE DRAWINGS

The above and other features and advantages of the invention will be apparent from the following description of an exemplary embodiment of the invention with reference to the accompanying drawings, in which.

DESCRIPTION OF EMBODIMENTS

Figure 1:
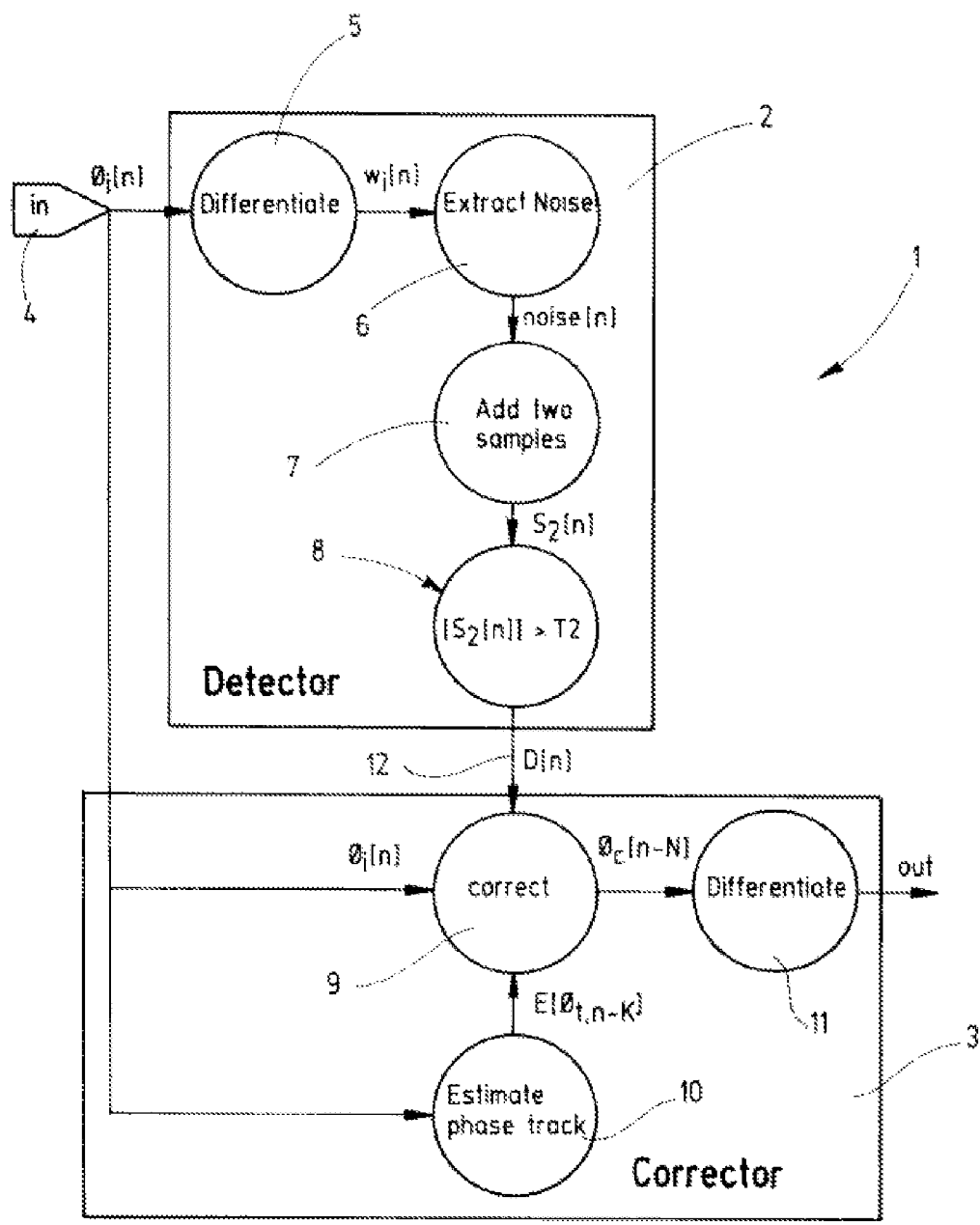
FIG. 1 shows a schematic diagram showing an embodiment of the inventive method.

FIG. 1 shows schematically a diagram 1 of the inventive method to reduce or remove click noise in FM radio receiver applications. The method might be used within a digital signal processor but might be used otherwise without being implemented in a digital signal processor. The application of the method improves FM radio reception.

According to FIG. 1 the method contains a detector part 2 and a correction part 3. Phase samples as input signal $\Phi_i[n]$ 4 will be inputted to the detector circuit 2 and in parallel to the correction circuit 3. The detector circuit performs at first a differentiation 5 of the input signal 4 $\Phi_i[n]$. The differentiation creates a signal $\omega_i[n]$ which is preferably a MPX signal. In block 6 an extraction of the noise of the signal $\omega_i[n]$ takes place resulting in a signal $d\omega[n]$. This extraction will be realised such that a low pass filtered version of the MPX signal will be subtracted from a delayed MPX signal. In the subsequent block 7 two consecutive noise samples will be added to create the signal $S_2[n]$. Finally in block 8 of the detector the absolute value of $S_2[n]$ will be compared with a predetermined threshold value T2. If the absolute value of the signal $S_2[n]$ exceeds the threshold value T2 a click is detected.

The corrector 3 has two inputs at stages at 9 and at 10 which are the delayed phase samples $\Phi_i[n]$ and the detection signal D[n] 12. At block 9 the input signal $\Phi_i[n]$ will be corrected using the detection signal D[n] and an estimated phase track signal $E[\Phi_{t,n-K}]$ creating a correction signal $\Phi_C[n-N]$ which will be differentiated at block 11 to obtain an output signal, preferably a MPX-output signal.

On detection of a click preferably the three phase samples causing the click will be corrected which are obtained from the last correct phase sample and the estimated phase track.

Figure 2:
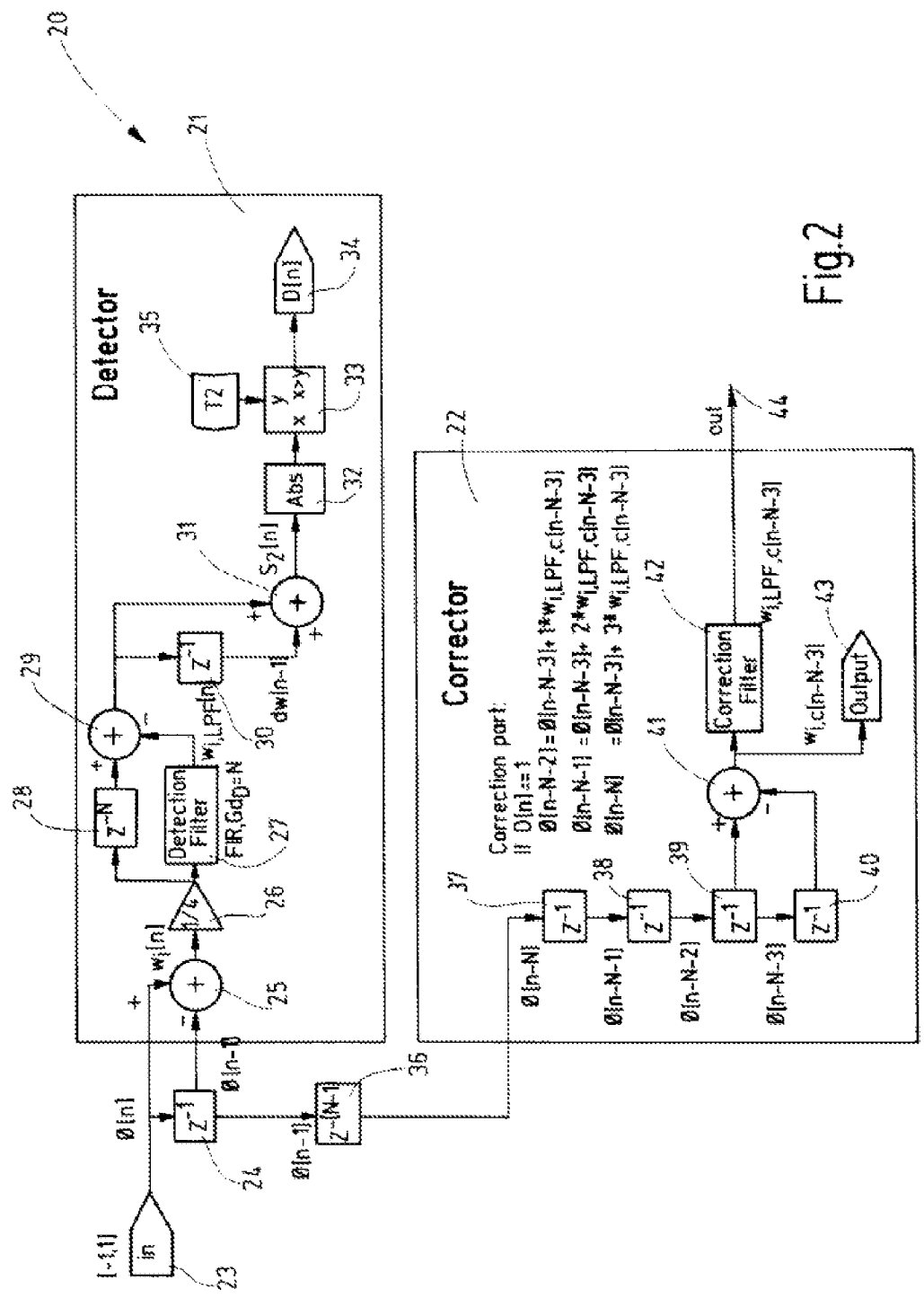
FIG. 2 shows a schematic diagram of a preferred embodiment of the inventive method.

FIG. 2 shows a diagram 20 of a preferred embodiment of the inventive method containing the detector subunit 21 and the corrector subunit 22, in which at 23 the phase samples $\Phi[n]$ are provided as input signal. The input signal $\Phi[n]$ is first inputted to the subtractor 25 and in parallel it will be delayed using a $Z^{-1}$ delay stage 24 creating a signal $\Phi[n-1]$ prior to subtracting it from the input signal $\Phi[n]$ at 25. The next blocks are used to extract the noise using an amplification stage 26, a detection filter 27 and a delay stage 28 and a subtraction stage 29. After the extraction of noise signal a delay stage 30 follows and a stage 31 fur summing up signals which create an addition of two signals which are shifted by one delay respectively. Finally the blocks 32 and 33 create the absolute value and compare the absolute value with the threshold T2. In case the absolute value of the signal at 33 is larger than the threshold $T_2$ or 35 a click is observed at 34.

The input signal will be treated furthermore using a $Z^{-(N-1)}$ delay stage 36 and subsequent $Z^{-1}$ delay stages 37, 38, 39 and 40. However, if a click has been detected, the samples in the delaylines 37, 38 and 39 are replaced by new samples which are derived from the sample in delayline 40 and the output 44 of the correction filter 42. The signal from stage 40 will be subtracted from signal of stage 39 at stage 41. Finally the signal from stage 41 will directly be outputted at 43.

REFERENCES 1 diagram
2 detector part, detector unit
3 correction part, correction unit
4 input signal
5 block
6 block
7 block
8 block
9 stage
10 stage
11 block
12 signal
20 diagram
21 detector unit
22 corrector unit
23 input signal
24 $Z^{-1}$ delayline stage
25 subtractor
26 amplifier
27 filter
28 $Z^{-N}$ delayline stage
29 subtractor
30 $Z^{-1}$ delayline stage
31 adding stage
32 stage creating an absolute value
33 stage comparing with threshold
34 output
35 threshold
36 $Z^{-(N-1)}$ delayline stage
37 $Z^{-1}$ delayline stage
38 $Z^{-1}$ delayline stage
39 $Z^{-1}$ delayline stage
40 $Z^{-1}$ delayline stage
41 adding stage
42 correction filter stage
43 correction filter output
44 output

The invention claimed is:

1. A method for detecting and correcting click noise in input signals processed by an FM radio receiver, the method comprising:
    differentiating, with a detector unit, first and second input phase signals;
    extracting, with the detector unit, first and second noise signals;
    comparing, with the detector unit, a sum of the first and second noise signals with a threshold value;
    detecting, with the detector unit, the click noise when the sum exceeds the threshold value;
    correcting, with the correction unit, the first input phase signal; and
    outputting a differentiated version of the corrected phase signal.

2. A method according to claim 1, wherein the differentiation creates an MPX signal.

3. A method according to claim 1, wherein the extraction takes place in a block an subtracts a low pass filtered signal from a delayed signal.

4. A method according to claim 1, further comprising:
    adding two consecutive noise signals to create a further signal;
    comparing an absolute value of the further signal with a predetermined threshold value; and
    detecting the clock noise when the absolute value exceeds the predetermined threshold value.

5. A method according to claim 1, further comprising:
    correcting a predetermined number of phase signals after detecting the click noise.

6. A method according to claim 5, further comprising:
    correcting three phase signals.

7. A method according to claim 1, wherein the method has been implemented within a digital signal processor.

8. An apparatus configured to reduce click noise in input phase signals processed by an FM radio receiver, the apparatus comprising:

a detector unit that is configured to differentiate the first and second input phase signals, extract first and second noise signals, compare a sum of the first and second noise signals with a threshold value, and detect the click noise when this sum exceeds the threshold value; and a correction unit that is configured to correct the first input phase signal and output a differentiated version of the corrected phase signal.

9. An apparatus according to claim 8, wherein the click noise is removed.

* * * * *